United States Patent
Kudawara et al.

(10) Patent No.: US 8,701,545 B2
(45) Date of Patent: Apr. 22, 2014

(54) ROTATION DEVICE

(75) Inventors: Tatuwo Kudawara, Kyoto (JP); Mikio Shimizu, Kyoto (JP); Yasunori Ichikawa, Kyoto (JP); Nobutaka Tsujiuchi, Kyotanabe (JP)

(73) Assignees: SQUSE Inc., Kyoto-shi (JP); The Doshisha, Kyoto-shi (JP)

( * ) Notice: Subject to any disclaimer, the term of this patent is extended or adjusted under 35 U.S.C. 154(b) by 691 days.

(21) Appl. No.: 12/935,875

(22) PCT Filed: Apr. 2, 2008

(86) PCT No.: PCT/JP2008/056597
§ 371 (c)(1),
(2), (4) Date: Sep. 30, 2010

(87) PCT Pub. No.: WO2009/122578
PCT Pub. Date: Oct. 8, 2009

(65) Prior Publication Data
US 2011/0023474 A1    Feb. 3, 2011

(51) Int. Cl.
*F16J 3/00* (2006.01)

(52) U.S. Cl.
USPC ............................................. 92/92; 417/480

(58) Field of Classification Search
USPC .............................. 92/90, 91, 92, 93; 623/26; 417/478–480; 601/5
See application file for complete search history.

(56) References Cited

U.S. PATENT DOCUMENTS

| | | | | |
|---|---|---|---|---|
| 2,642,091 | A | * | 6/1953 | Morin .............................. 92/90 |
| 4,819,547 | A | * | 4/1989 | Kukolj ........................... 92/261 |
| 4,944,755 | A | * | 7/1990 | Hennequin et al. ........ 623/18.11 |

FOREIGN PATENT DOCUMENTS

| | | |
|---|---|---|
| CA | 2105475 A | 9/1992 |
| JP | 60132103 A | 7/1985 |
| JP | 1-501447 T | 5/1989 |
| JP | 2008-032140 A | 2/2008 |
| WO | 8911381 A1 | 11/1989 |
| WO | 2006080088 A1 | 8/2006 |
| WO | 2007094031 A1 | 8/2007 |

OTHER PUBLICATIONS

ISA Japanese Patent Office, International Search Report of PCT/JP2008/056597, Jun. 17, 2008, 2 pages.
ISA European Patent Office, Search Report of EP08739708.9, Mar. 20, 2012, Germany, 4 pages.

* cited by examiner

*Primary Examiner* — Edward Look
*Assistant Examiner* — Logan Kraft
(74) *Attorney, Agent, or Firm* — Alleman Hall McCoy Russell & Tuttle LLP (57) ABSTRACT

In a rotation device using a hydraulic actuator, a rotation angle range is increased. A placement member rotatably coupled to a rotary member has a projecting part on an upper face. A hydraulic actuator is arranged on a projecting face of the projecting part; the actuator and the rotary member coupled with a wire material. The projecting part is formed such that it becomes higher from a leading edge on the side of the rotary member to an intermediate portion in the longitudinal direction, and becomes lower from the intermediate portion to a trailing edge. Thereby, when fluid is supplied to the actuator and shortens the actuator length, a tip of the actuator moves along the projecting face of the projecting part, and is located high, separated from the upper face of the placement member such that the rotation angle range of the rotary member becomes large.

20 Claims, 10 Drawing Sheets

Prior Art

Fig. 10 (b)

Prior Art

ROTATION DEVICE

TECHNICAL FIELD

The present invention relates to a rotation device for rotating a rotary member by an operation of an actuator, and more specifically, to a rotation device that increases a rotation angle range of the rotary member.

BACKGROUND ART

Conventionally, there exist rotation devices for rotating a rotary member using an actuator which operates by being supplied with fluid, such as air or liquid. The actuator applied to this kind of rotation device has a tube shape as a whole, and is often a type in which a dimension in a diameter direction perpendicular to the full length direction thereof is inflated by the supply of fluid (a type called a McKibben type or hydraulic type actuator).

Figure 10:
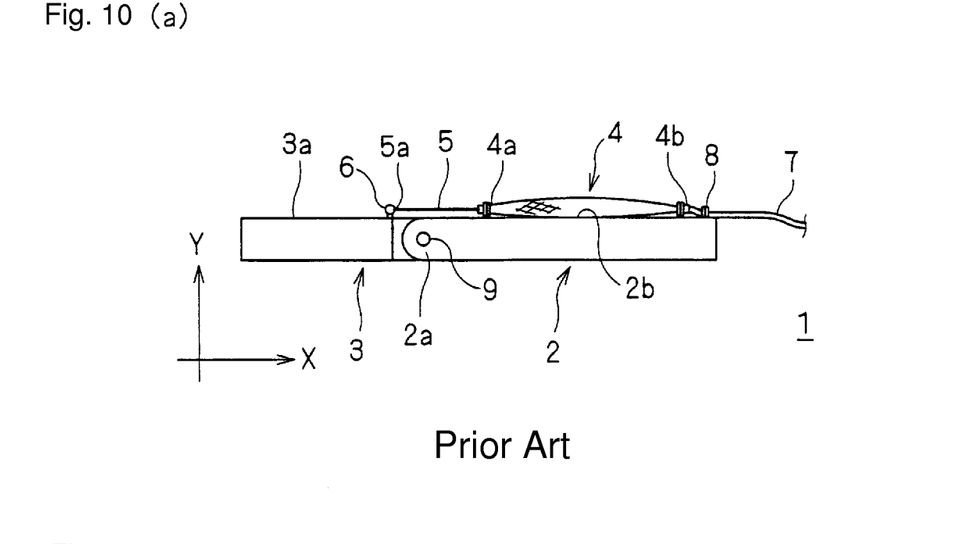
FIG. 10(a) is a side view in a state where fluid is not supplied.
FIG. 10(b) is a side view in a state where the actuator is inflated to the maximum extent.

FIGS. 10(a) and 10(b) show a conventional common rotation device 1. In the conventional rotation device 1, a plate-shaped rotary member 3 is rotatably coupled to one end part 2a of an elongated-plate-shaped placement member 2 (a rotation center is a rotation shaft 9), and a tube-shaped, hydraulic type actuator 4 is arranged on an upper face 2b of the placement member 2. The actuator 4 is attached with a wire material 5 at a tip 4a thereof, and an end part 5a of the wire material 5 is coupled to an upper face 3a of the rotary member 3 via an anchor 6. In addition, the actuator 4 connects with a hose 7 for fluid (for example, air) supply at a rear end 4b thereof, and the hose 7 is fixed to the upper face 2b of the placement member 2 by a fixing member 8, thereby the actuator 4 is fixedly attached to the placement member 2.

From a state of FIG. 10(a), when the fluid is supplied to the actuator 4 through the hose 7, the actuator 4 is inflated as shown in FIG. 10(b). Here, the full length of the actuator 4 parallel to the X-direction in this figure (the longitudinal direction of the placement member 2) shrinks, and the radial dimension of the actuator 4 parallel to the Y-direction in this figure (the thickness direction of the placement member 2) expands. Therefore, the actuator 4 pulls the rotary member 3 via the wire material 5. The actuator 4 pulling the rotary member 3 rotates the rotary member 3 by an angle α from the state shown in FIG. 10(a) centering on the rotation shaft 9. FIG. 10(b) shows a state in which the actuator 4 is inflated to the maximum extent, and in this state, it is assumed that the wire material 5 is in parallel to the X-direction.

Components equivalent to the rotation device 1 as shown in FIGS. 10(a) and 10(b) described above are also disclosed in the following Patent documents 1 to 3.

REFERENCE DOCUMENT(S) OF RELATED ART

[Patent document 1] JPA S60-132103
[Patent document 2] JPY H06-505326
[Patent document 3] WO2006/080088

DISCLOSURE OF THE INVENTION

Problem(s) to Be Solved by the Invention

In the conventional rotation device 1 shown in FIGS. 10(a) and 10(b), the posture of the wire material 5 is substantially parallel to the X-direction in these figures. Therefore, even if the wire material 5 is pulled in the arrow direction shown as the X-direction in the state of FIG. 10(a), a force component in the Y-direction which is important to rotate the rotary member 3 centering on the rotation shaft 9 (a force component in the tangent direction of the rotary member 3 as a circle centering on the rotation shaft 9) will not be large at a start timing of the rotation. For this reason, as shown in FIG. 10(a), when the rotary member 3 is first rotated from the posture of the horizontal state, there is a problem in which the rotation of the rotary member 3 is difficult to start smoothly.

The rotation device 1 described above may be applied to various uses. However, when applied to a fingertip part of a robot hand, there may be a case where a sufficient dimension in the X-direction of FIGS. 10(a) and 10(b) is unable to be secured, for example. If the dimension in the X-direction cannot fully be secured, a size of the actuator 4 adopted to the rotation device 1 must be small. Therefore, because the actuator 4 of a small size has a small operation range, there is a problem in which the rotation angle range of the rotary member 3 cannot be increased even if the actuator 4 is operated to the maximum extent.

Further, in the conventional rotation device 1, the actuator 4 is attached to the placement member 2 so as to be aligned, by a part of the hose 7 (or the rear end 4b of the actuator 4, etc.) being fixed to the placement member 2 with the fixing member 8. However, in the state of pulling the wire material 5, as shown in FIG. 10(b), a stress against the pulling tends to concentrate near a fixing part 7a of the hose 7 by the fixing member 8. Therefore, by the stress being intensively applied repeatedly in connection with a use frequency, there is a problem in which the fixing part 7a and its neighborhood deteriorate easily compared with other portions.

The present invention is made in view of the above problems to provide a rotation device in which a projecting part, on which an actuator is laid, is provided on a placement member, to direct a pulling angle of a rotary member upward to smooth a start of a rotation of the rotary member, as well as a rotation angle range of the rotary member can be increased and degradation due to the use can be reduced.

Means for Solving the Problems

In order to solve the above-described problems, according to an aspect of the present invention, a rotation device includes a tubular actuator that inflates in a diameter direction so that a full length is shortened by being supplied with fluid, a placement member on which the actuator is arranged and to which one end part side of the actuator is fixed, a rotary member rotatably coupled to the placement member at the other end part side of the actuator, and a wire material for connecting the other end part of the actuator with the rotary member. The placement member is provided with a projecting part on a surface where the actuator is arranged, and the actuator is arranged on a projecting face of the projecting part.

In the aspect of the present invention, because the projecting part is provided to the placement member and the actuator is arranged on the projecting face of the projecting part, the actuator pulls the rotary member via the wire material from a higher position compared with the related art. For this reason, when starting a rotation of the rotary member in a horizontal state, a force component important to rotate the rotary member can be made larger than the related art, and associated with this, the rotary member in the horizontal state can be raised and rotated smoothly.

Moreover, in the rotation device according to the aspect of the invention, the projecting face of the projecting part may have a slope face where a projecting dimension thereof is higher from the connecting side of the rotary member to an intermediate portion of the projecting part in a direction corresponding to the full length direction of the actuator.

In the aspect of the invention, at least a part of the projecting face of the projecting part is formed in the slope face, and an inclination of the projecting face is made such that the face becomes higher from the connecting side of the rotary member toward the intermediate portion of the projecting part. Therefore, the other end part of the actuator to which the wire material is attached moves up the slope face as the full length of the actuator becomes shorter with the fluid supply and thus, the position of the other end part becomes higher. For this reason, because the other end part of the actuator can be located at the same height as the related art when the fluid is not supplied, the rotary member can be made into the horizontal posture even if the wire material of the same length as the related art is used. On the other hand, when the position of the other end part of the actuator becomes higher as the fluid is supplied, the actuator will draw the rotary member nearer than the related art because of the condition where the actuator pulls the rotary member from obliquely upward. As a result, a rotation angle range can be increased.

Further, in the rotation device according to the aspect of the invention, the projecting face of the projecting part may have a slope face where a projecting dimension thereof is lower from the intermediate portion of the projecting part to the fixed side of the actuator in a direction corresponding to the full length direction of the actuator.

In the aspect of the invention, because the slope face that becomes lower from the intermediate portion of the projecting part to the fixed side of the actuator is formed on the projecting face of the projecting part, when the fluid is supplied to the actuator, the full length of the actuator will be shorter so that the other end side of the actuator to which the wire material is attached moves to the fixed side of the actuator. Therefore, the actuator will be in a posture such that the other end side thereof is raised along the slope face, and the fixed side thereof is lowered. The actuator pulls the wire material in the posture where the other end side to which the wire material is attached is raised; a resisting force against the pulling is also applied to the slope face of the projecting part. As a result, a stress which is concentrated on a fixed part of the actuator in the conventional actuator can also be distributed to the resisting force over the slope face and, thus, degradation of the fixed part of the actuator can be suppressed. In addition, because the posture of the actuator to which the fluid is supplied inclines, it can contribute more to the pulling of the rotary member, compared with a case where it is not inclined.

Further, in the rotation device according to the aspect of the invention, the projecting face of the projecting part may have a first slope face where a projecting dimension thereof is higher from the connecting side of the rotary member to the intermediate portion of the projecting part, and a second slope face where a projecting dimension thereof is lower from the intermediate portion to the fixed side of the actuator, in a direction corresponding to the full length direction of the actuator. The second slope face may be less slippery compared with the first slope.

In the aspect of the invention, the first slope face that becomes higher from the connecting side of the rotary member to the intermediate part of the projecting part, and the second slope face that becomes lower from the intermediate portion of the projecting part to the fixed side of the actuator, are formed on the projecting face of the projecting part. Therefore, the rotation angle range of the rotary member can be increased by the first slope, and the degradation of the fixed part of the actuator can be suppressed by the second slope. Moreover, because the second slope face is less slippery compared with the first slope face, the actuator in the posture where the other end to which the wire material is attached is raised can easily secure a state in which the actuator holds on the second slope face and, thus, the degradation of the fixed part of the actuator can be further suppressed.

Further, in the rotation device according to the aspect of the invention, the placement member may be arranged with another actuator in parallel with the actuator. A side face of the projecting part to which the other actuator opposes may be hollowed in a concave shape.

In the aspect of the invention, the side face of the projecting part is hollowed in the concave shape in such a case where the two or more actuators are arranged in parallel to each other to use the rotation device. Therefore, even when the fluid is supplied to the actuator(s) arranged to the side face of the projecting part to inflate the actuator, the inflated actuator will be fit in the concaved hollow part of the projecting part. Thereby, an interference of the actuators that are inflated by the fluid supply is further prevented even if the actuators are arranged with a shorter interval, compared with a case where each actuator is arranged on a flat plane. Therefore, the two or more actuators can be arranged compactly.

Effect of the Invention

In the aspect of the invention, the actuator is placed on the projecting part provided to the placement member. Therefore, the actuator can pull the rotary member from a higher position compared with the related art, and thus, it can smoothly rotate the rotary member in the horizontal state.

Further, in the aspect of the invention, the slope face which becomes higher from the connecting side of the rotary member to the intermediate portion of the projecting part is formed on the projecting face of the projecting part. Therefore, the rotation angle range of the rotary member by the operation of the actuator can be made larger than the related art.

Further in the aspect of the invention, the slope face which becomes lower from the intermediate portion of the projecting part to the fixed side of the actuator is formed on the projecting face of the projecting part. Therefore, it can contribute to that, when the actuator pulls the rotary member, the stress which is conventionally concentrated onto the fixed part of the actuator is distributed over the slope face that supports the actuator, the degradation of the fixed part of the actuator is suppressed, and the rotation angle range of the rotary member is increased.

In the aspect of the invention, the first slope face and the second slope face that incline in different directions are provided to the projecting part. Therefore, the rotation angle range of the rotary member can be increased by the first slope face and the second slope face, and the degradation of the fixed part of the actuator can be suppressed by the second slope face. In addition, because the second slope face is less slippery compared with the first slope face, it can further suppress the degradation of the fixed part of the actuator.

In the aspect of the invention, in the case in which the rotation device where the two or more actuators are arranged in parallel to each other is used, even if the actuators are arranged with shortened intervals, the interference of the actuators which are inflated by the fluid supply can be prevented and, thus, the two or more actuators can be arranged compactly.

BRIEF DESCRIPTION OF THE DRAWINGS

FIGS. 1(a), 1(b) and 1(c) show a rotation device according to an embodiment of the present invention, where

FIGS. 2(a) and 2(b) show a projecting part according to the present invention, where

FIGS. 3(a) and 3(b) show an actuator according to the embodiment, where

FIGS. 4(a) and 4(b) show the actuator according to the embodiment, where

FIGS. 8(a) and 8(b) are cross-sectional views taken along a line B-B of FIG. 7, where

FIGS. 9(a) and 9(b) show a rotation device of another modified embodiment of the present invention, where

FIGS. 10(a) and 10(b) show a conventional common rotation device, where

DESCRIPTION OF NUMERALS

10 Rotation Device
12 Placement Member
13 Rotary Member
14 Actuator
15 Wire Material
17 Hose
20, 45 Projecting Part
20a Projecting Face
20b First Slope Face
20c Second Slope Face
45a, 45b Side Face

BEST MODE OF CARRYING OUT THE INVENTION

Figure 1:
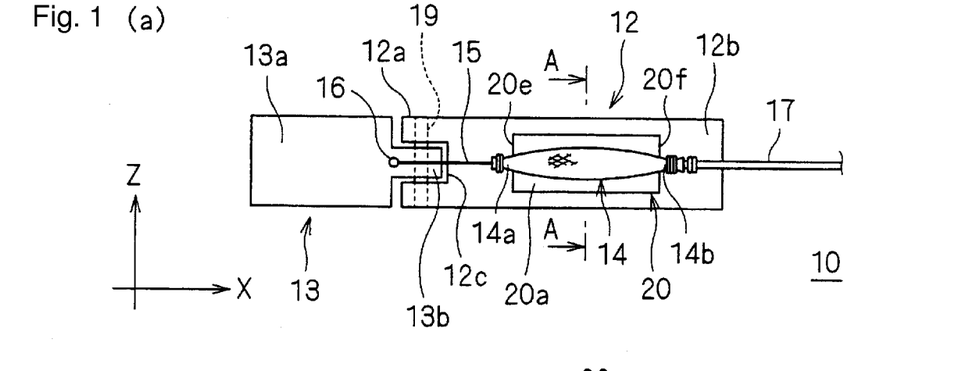
FIG. 1(a) is a plan view.
FIG. 1(b) is a side view.
FIG. 1(c) is a cross-sectional view taken along a line A-A in FIG. 1(a).

FIGS. 1(a) to (c) show a rotation device 10 according to an embodiment of the present invention. The rotation device 10 of this embodiment is equivalent in fundamental configuration to the conventional rotation device 1 shown in FIGS. 10(a) and 10(b). However, it has a new component including a projecting part 20 provided on an upper face 12b of a placement member 12 where an actuator 14 is arranged, and the actuator 14 placed on a projecting face 20a that is an upper face of the projecting part 20. By applying the new component, the rotation device 10 is characterized in that it enables a rotation of a rotary member 13 smoothly by being pulled by the actuator 14 and increases a rotation angle range. Note that each of X-direction, Y-direction, and Z-direction shown in each figure is a direction perpendicular to the others, and the respective directions are common in each figure.

In the rotation device 10, the flat-plate-shaped rotary member 13 is rotatably coupled to one end part 12a of the elongated-plate-shaped placement member 12. Specifically, as shown in FIG. 1(a), the placement member 12 has a concave portion 12c in the central part of the placement member 12 in the width direction (i.e., the short side direction, which corresponds to the Z-direction in FIG. 1(a)) on the side of the one end part 12a. On the other hand, the rotary member 13 has a convex part 13b on the side connecting to the placement member 12. A rotation shaft 19 penetrating the both (the concave portion 12c and the convex part 13b) in a state in which the convex part 13b is located inside the concave portion 12c of the placement member 12 is fit. Thereby, the rotary member 13 is rotatable centering on the rotation shaft 19. The placement member 12 and the rotary member 13 of this embodiment are made of a synthetic resin.

Figure 2:
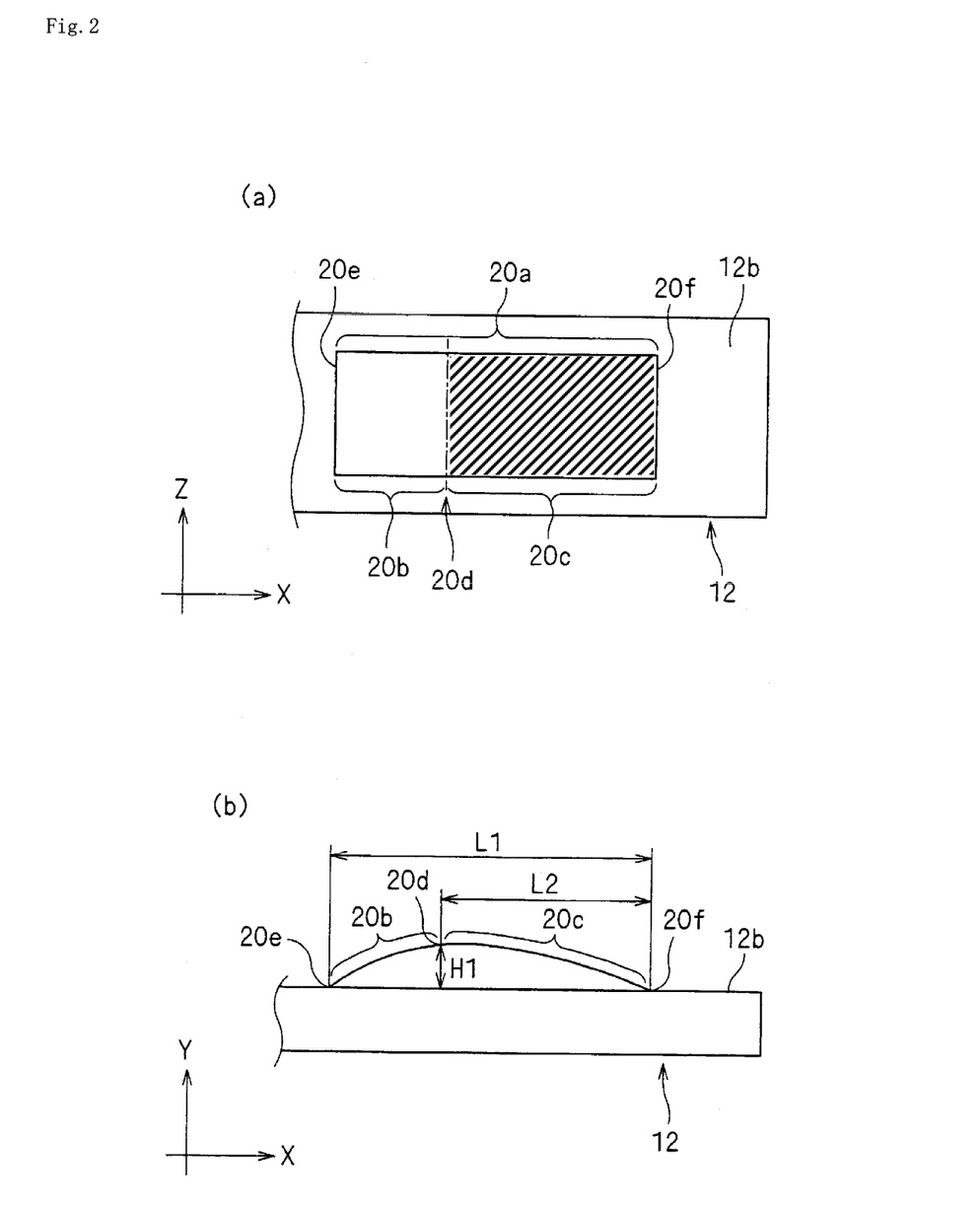
FIG. 2(a) is a plan view.
FIG. 2(b) is a side view.

As shown in FIG. 1(b), FIG. 2(b) and the like, the placement member 12 is provided with the hill-shaped projecting part 20 on the upper face 12b. The projecting part 20 has a first slope face 20b from a hill-shaped peak part 20d to the side of the rotary member 13, and has a second slope face 20c from a hill-shaped peak part 20d to the opposite side from the rotary member 13 (refer to FIGS. 2(a) and (b)). The first slope face 20b is formed in an upwardly convex, loosely curved surface extending in a direction corresponding to the longitudinal direction of the placement member 12 (the X-direction in these figures) so that the projecting dimension becomes higher from a leading edge 20e, which is on the connecting side to the rotary member 13, to the peak part 20d corresponding to an intermediate part of the projecting part 20. The second slope face 20c is formed in an upwardly convex, loosely curved surface extending in the X-direction in these figures so that the projecting dimension becomes lower from the peak part 20d of the projecting part 20 to a trailing edge 20f on the opposite side of the rotary member 13.

Such first slope face 20b and second slope face 20c are combined to form a projecting face 20a which is the upper face where the actuator 14 is arranged. The surface of the second slope face 20c is less slippery compared with the surface of the first slope face 20b. In detail, the surface of the first slope face 20b is finished in a fine, smooth surface where a surface roughness is small, and the second slope face 20c is finished in a rough surface where the surface is made rough to have the surface roughness being large. Here, as the method of making the second slope face 20c less slippery compared with the first slope face 20b, it may be considered that the surface of each of the slope faces 20b and 20c is finished equally, and a sheet with a large friction coefficient (for example, a rubber sheet) is applied only to the second slope face 20c, or the like.

Further, in the projecting part 20, in this embodiment, the projecting dimension of the peak part 20d (dimension in the Y-direction which is the thickness direction of the placement member 12 shown in FIG. 2(b)) is set to a height H1, and a dimension from the trailing edge 20f in the horizontal direction (X-direction) to the peak part 20d is set to a length L2 (the full length of the projecting part 20 in the X-direction is a length L1). The height H1 and the length L1 of the full length of the projecting part 20 are determined based on dimensions of the actuator 14 to be adopted. Each dimension (height H1, length L1) is determined, in a state in which near a rear end 14b of the actuator 14 is aligned with the trailing edge 20f of the projecting part 20, a tip 14a of the actuator 14 projects slightly from the leading edge 20e of the projecting part 20 to locate in the upper face 12b of the placement member 12. The length L2 which is a dimension from the trailing edge 20f to the peak part 20d is set to a dimension corresponding to a full length T2 (refer to FIG. 3(b)) when the actuator 14 of this embodiment described later is inflated to the maximum extent (in this embodiment, L2=T2). Therefore, the tip 14a, to which a wire material 15 of the actuator 14 is coupled, locates at the highest position from the upper face 12b of the placement member 12 when the actuator 14 is inflated to the maximum extent.

In this embodiment, the projecting part 20 corresponding to a part of the placement member 12 is formed by piling up a putty-like hardening resin on the upper face 12b of the placement member 12. However, if the placement member 12 is made from the synthetic resin and formed by injection molding in a metallic mold, the placement member 12 and the projecting part 20 may be integrally formed by forming a portion corresponding to the projecting part 20 in the metallic mold.

FIGS. 3(a) and 3(b), and FIGS. 4(a) and 4(b) show the actuator 14 applied to the rotation device 10 of this embodiment. The actuator 14 is supplied with an operating fluid through a hose 17 connected therewith, and, in this embodiment, air is supplied as the fluid. An operating fluid source (air supply source) is connected to a non-illustrated end of the hose 17.

Figure 4:
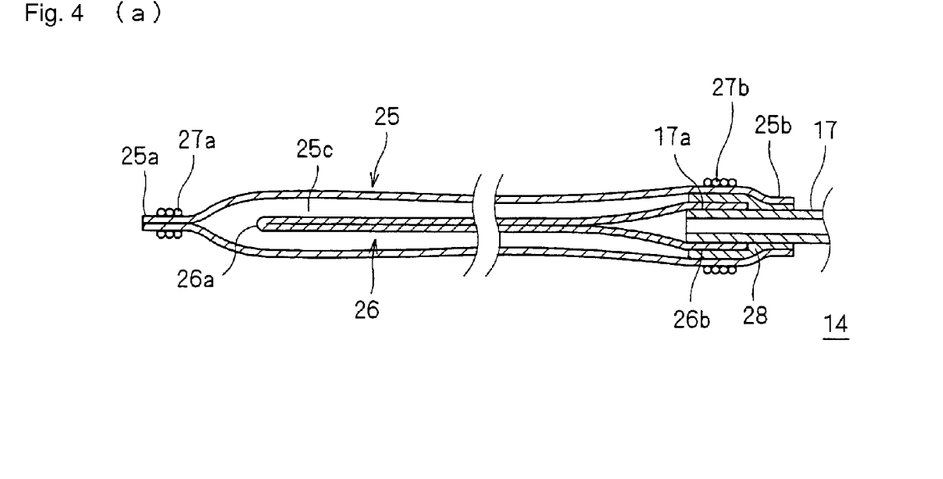
FIG. 4(a) is a cross-sectional view in a state where the fluid is not supplied.
FIG. 4(b) is a cross-sectional view in a state where the fluid is supplied to inflate the actuator to the maximum extent.

As shown in FIGS. 4(a) and 4(b), the actuator 14 is configured so that a bag body 26 is covered with a covering body 25. The bag body 26 accommodated in an inner space 25c of the covering body 25 is formed of a non-rubber material, and, in this embodiment, a material containing a polypropylene component which is a synthetic polymer compound through which the fluid does not pass is used. For the synthetic polymer compound having the characteristic of not passing the fluid, a material containing, as an component, at least one of polypropylene, VCM/PVC, Teflon®, polyester, polyamide, polyethylene, polyimide, polystyrene, polycarbonate and the like, is applicable to the material of the bag body 26 (it is also possible to make the components described above intermingled). In an environment where such a synthetic polymer compound cannot be used or an environment where it is not humid, other materials which do not pass the fluid are also applicable to the material of the bag body 26.

As for the bag body 26, an end part 26b to which the hose 17 is connected is an opening end, and a tip part 26a opposing to the opening end is a closed end. To fix the hose 17 at the end part 26b, the end part 26b is winded with a thread-like bundling material (not illustrated in FIGS. 4(a) and 4(b)) in a state in which the hose 17 is inserted in the end part 26b, the insertion range of the hose 17 is covered with a heat contraction tube 28 from the outside, and a predetermined amount of heat is added to the heat contraction tube 28 to shrink the tube.

On the other hand, the covering body 25 is formed in an elastic cylindrical shape having a size to cover the bag body 26 so as to expand and contract, and, in this embodiment, is knitted into a hollow tube by a cord knitting machine using a polyester multifilament yarn (275 decitex) which is a thread made of ester. When knitting, the stitches are made in rhombus (bias) shapes, and the long diagonal line direction of the rhombus (bias) is in agreement with the longitudinal direction of the covering body 25 (X-direction, corresponding to the full length direction of the actuator 14) in a non-loaded state. Thus, the stitches are easy to expand and contract in a direction parallel to the Y-direction shown in FIG. 3(b), exert a necessary tensile force, and increase in a tightening force when it expands more.

Such a covering body 25 secures a flexibility to allow itself to expand and contract associated with the deformation of the bag body 26; however, it generates, in a state in which it expands to the maximum extent, the tightening force which can resist and hold a pressing force generated by the bag body 26 being inflated. Such a predetermined tightening force can be obtained by knitting into the hollow tube using the polyester multifilament yarn.

In order to manufacture the actuator 14 using the bag body 26 and the covering body 25 described above, first, the bag body 26 in the state in which the hose 17 is fixed to the end part 26b is covered with the cylindrical covering body 25, then, one end part 25b of the covering body 25 from which the hose 17 extends is winded with a thread-like bundling member 27b, and the end part 25b is then bundled and fixed with the heat contraction tube 28 that covers the end part 26b of the bag body 26. The covering body 25 is also winded with a thread-like bundling member 27a at a tip part 25a thereof on the opposite end to close the tip part 25a, thereby the actuator 14 is formed. Here, the tip part 26a of the bag body 26 is made to be a free end without being fixed. Note that, other than the thread-like members, cable ties made of a synthetic resin, bundling metals, clamp members, string-like members and the like, are applicable to the bundling members 27a and 27b.

The formed actuator 14 is very flexible because the bag body 26 is thin (a thickness of one-sheet portion is 50 μm) when the fluid is not supplied, where a thickness of the actuator 14 itself is in agreement with a thickness of the covering body 25. Therefore, when the actuator 14 is placed on the projecting part 20 of the placement member 12 described above, it deforms in a "He" shape of Japanese "hiragana" character (a chevron shape) conforming to the shape of the projecting face 20a of the projecting part 20 (refer to FIG. 1(b)). When the fluid (air) is supplied to the actuator 14 through the hose 17, the bag body 26 begins to inflate, and a diameter of the covering body 25 expands in a direction perpendicular to the X-direction, following the inflation. Here, because the bag body 26 is made of the non-rubber material, it can be inflated smoothly even if a supplying pressure of the fluid is low.

Figure 3:
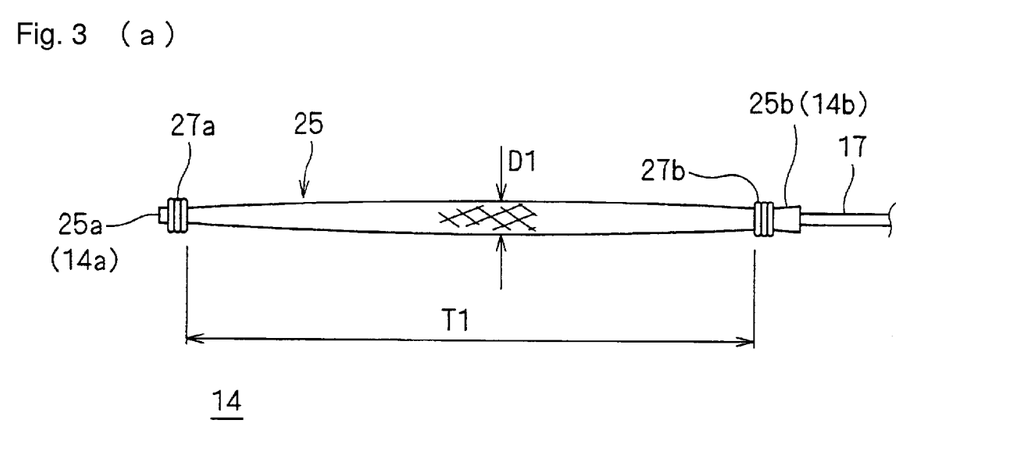
FIG. 3(a) is a side view in a state where fluid is not supplied.
FIG. 3(b) is a side view in a state where the fluid is supplied to inflate the actuator to the maximum extent.

When the fluid supply is further continued, the actuator 14 eventually deforms into a state shown in FIG. 3(b) and FIG. 4(b), and the full length of the actuator 14 will be shortened to the dimension T2 from a dimension T1 in the state in which fluid is not supplied (T1>T2), and the diameter of the actuator will be larger to a dimension D2 from a dimension D1 in the state in which fluid is not supplied (D1<D2). A shrinkage ratio (a rate of the full length contracting from the dimension T1 to the dimension T2) of the actuator 14 applied to this embodiment is about 40%. The dimensions T1 and T2 described above are a distance between the bundling members 27a and 27b of the actuator 14, (the ends 14a and 14b of the actuator 14 are located outside of the bundling members 27a and 27b).

Next, a procedure for manufacturing the rotation device 10 by arranging the actuator 14 described above on the projecting face 20a of the projecting part 20 of the placement member 12 is described. First, the wire material 15 is attached to the tip 14a (corresponding to the other end part) of the actuator 14 in advance. The wire material 15 can be attached by winding it around the tip 14a of the actuator 14. However, if using a line material or the like as the wire material 15, it is also possible to provide an anchor to an end part on the attaching side, to lead the anchor to the inside of the tip part 25a of the covering body 25 shown in FIG. 4(a), and to fasten the anchor and the tip part 25a together with the thread-like bundling member 27a. Here, a length of the wire material 15 used is set, in the state in which the actuator 14 is attached as shown in FIGS. 1(a) and 1(b), to a dimension so that the rotary member 13 is in a horizontal state with respect to the placement member 12.

Next, in the state in which the rear end 14b of the actuator 14 in the X-direction (corresponding to the one end part) is positioned so as to align with the trailing edge 20f of the projecting part 20, the hose 17 extending from the rear end 14b is fixed to the upper face 12b of the placement member 12 by a fixing member 18. The fixing member 18 is a thread-like member which is winded through two through-holes (not shown) formed in the placement member 12 to fix the hose 17 onto the placement member 12, however such a fixing way may be replaced by other ways. For example, it may also be possible to apply a U-shaped clamp member as the fixing member 18, and to hammer it so that both the ends of the clamp member are driven into the upper face 12b of the placement member 12 to hold down the hose 17, thereby fixing the actuator 14.

Then, the end part 15a of the wire material 15 extending from the tip 14a of the actuator 14 is fixed to an anchor 16 that is attached in advance to a surface 13a of the rotary member 13, and the actuator 14 and the rotary member 13 are coupled via the wire material 15, thereby the rotation device 10 is formed. The dimensions of the respective members 12 and 13, the actuator 14, and the wire material 15 which are used in the rotation device 10 of this embodiment are made the same as those of the respective members 2 and 3, the actuator 4, and the wire material 5 which are applied to the conventional rotation device 1 shown in FIGS. 10(a) and 10(b). In addition, the positions of the anchor 16 and the tip 14a of the actuator 14 when the fluid is not supplied are designed so that they are equivalent to those of the rotation device 1. In addition, as for the actuator 14, what is equivalent to the actuator 4 of the conventional rotation device 1 is used. However, only the fixed position of the hose 17 onto the placement member 12 on the side of the rear end 14b of the actuator 14 is, in this embodiment, because the actuator 14 is placed on the projecting part 20, located closer to the rotary member 13 compared with the fixed position in the conventional rotation device 1.

Figure 5:
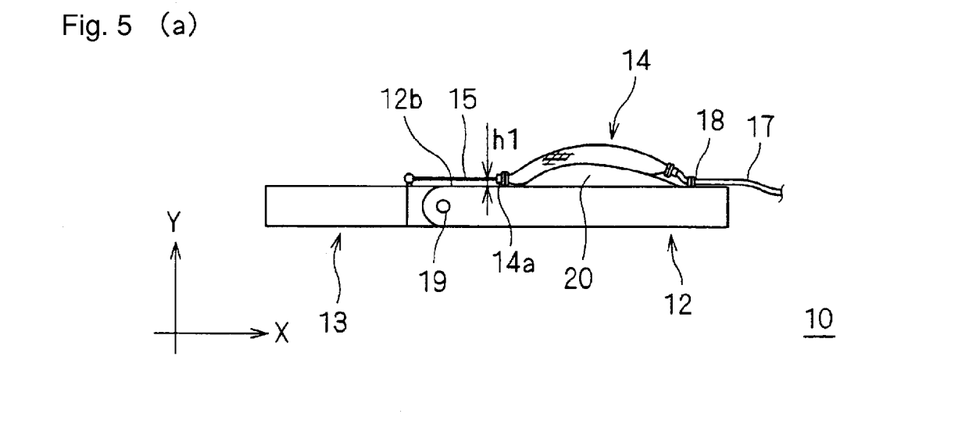
FIG. 5(a) is a side view of the rotation device in the state where the fluid is not supplied.
FIG. 5(b) is a side view of the rotation device in a state where a fluid supply is started.
FIG. 5(c) is a side view of the rotation device in the state where the actuator is inflated to the maximum extent.

Next, based on FIGS. 5(a) to (c), a state in which the fluid is supplied to the actuator 14 through the hose 17 to rotate the rotary member 13 is described. First, in the state in which the fluid is not supplied as shown in FIG. 5(a), the tip 14a of the actuator 14 is located on the upper face 12b of the placement member 12 so as to be offset from the projecting part 20. Therefore, the wire material 15 is located at a height separated from the upper face 12b of the placement member 12 by the thickness of the tip 14a of the actuator 14 (i.e., by a distance h1) and, thus, it is in a posture parallel to the upper face 12b of the placement member 12. Note that such a state of the tip 14a of the actuator 14 is equivalent to the state in which the fluid is not supplied in the conventional rotation device 1 shown in FIG. 10(a).

Next, as shown in FIG. 5(b), when the fluid supply to the actuator 14 is started, the actuator 14 is inflated to shorten its full length, however, because the rear end 14b side is fixed to the placement member 12 by the fixing member 18, the tip 14a moves to the rear end 14b side. When the tip 14a of the actuator 14 moves to the rear end 14b side, the tip 14a slips in the white arrow direction in FIG. 5(b) so that it moves up the first slope face 20b of the projecting part 20. Therefore, the attachment side of the wire material 15 to the tip 14a will be located at a distance h2 which is larger than a distance h1 of FIG. 5(a), as a height from the upper face 12b of the placement member 12 (h2>h1). For this reason, the actuator 14 will pull the rotary member 13 via the wire material 15 from a higher position compared with the related art to start the rotation of the rotary member 13. Therefore, the rotation of the rotary member 13 can be started smoothly from the horizontal state shown in FIG. 5(a).

In other words, as for the wire material 15, because the connecting side to the actuator 14 becomes high in the state shown in FIG. 5(b), a force component parallel to the Y-direction (Y-direction vector) is generated more than the conventional art in a tensile force associated with the wire material 15, as well as a force component parallel to the X-direction (X-direction vector). Because this force component parallel to the Y-direction acts to rotate the rotary member 13 in the horizontal state, it is possible to rotate the rotary member 13 with a sufficient response. In addition, because the first slope face 20b of the projecting part 20 is the smooth surface, the tip 14a side of the actuator 14 can move smoothly on the first slope face 20b.

FIG. 5(c) shows a state in which the fluid is further supplied to inflate the actuator 14 to the maximum extent from the state shown in FIG. 5(b). When the actuator 14 is inflated to the maximum extent, based on the relationship between the distance from the trailing edge 20f of the peak part 20d of the projecting part 20 (the length L2 shown in FIG. 2(b)) and the full length T2 of the actuator 14 when it is inflated to the maximum extent (refer to FIG. 3(b)) (L2=T2), the tip 14a of the actuator 14 is located near the peak part 20d of the projecting part 20, and located at a height most separated from the upper face (12b) of the placement member 12 (the height from the upper face 12b is a distance h3, where h3>h2). For this reason, the wire material 15 will be in a posture where it is inclined the most, and, in the state shown in FIG. 5(c), it is inclined by an angle γ with respect to the X-direction.

Therefore, if the length of the wire material 15 is set to "S," a dimension of the wire material 15 parallel to the X-direction in the state shown in FIG. 5(c) will be S×cos γ, and compared with the case of the conventional art shown in FIG. 10(b), a dimension of the wire material 15 parallel to the X-direction will be shorter by S×(1−cos γ). As a result, because the actuator 14 is fixed to the placement member 12 at the rear end 14b side, the rotary member 13 will be drawn toward the placement member 12 at least by a distance which is more by the distance of S×(1−cos γ) than that of the conventional art. Therefore, a rotation angle β of the rotary member 13 will be greater than the rotation angle α in the conventional rotation device 1 shown in FIG. 10(b) (i.e., β>α). For this reason, even when an actuator with a large operation length is hard to apply because a large dimension cannot be secured in the X-direction, the rotation device 10 of this embodiment has an advantage in which the rotation angle of the rotary member can be increased. When the state of FIG. 5(c) is seen in detail, because the actuator 14 itself is also located on the second slope face 20c, it will be in the inclined posture. Therefore, the dimension in the direction parallel to the X-direction in the inclined posture will be shorter than the full length T2 when the actuator 14 is inflated to the maximum extent as shown in FIG. 3(b). Specifically, if the inclination angle of the actuator 14 with respect to the X-direction in the state shown in FIG. 5(c) is set to Λ, then a shortened dimension of the actuator 14 in the X-direction will be T2×(1−cos Λ). For this reason, the total of T2×(1−cos Λ) and S×(1−cos γ) which is the dimension of the wire material 15 described above relates to a difference of the rotation angle of the rotary member 13 with respect to the conventional rotation device 1 shown in FIG. 10(b), and, therefore, the second slope face 20c contributes to an increase of the rotation angle of the rotary member 13.

Further, in the state shown in FIG. 5(c), the actuator 14 is located on the second slope face 20c, and is difficult to slip on the second slope face 20c. Therefore, the actuator 14 is in a state in which it is supported with a large gripping force, and the resisting force according to the pulling by the wire material 15 will be applied to the second slope face 20c in the white arrow direction in FIG. 5(c). For this reason, compared with the case of the conventional art shown in FIG. 10(b), the stress concentrated on a fixing part 17a of the hose 17 by the fixing member 18 which fixes the actuator 14 is distributed to the second slope face 20c as the resisting force, and, therefore, degradation of the parts relating to the fixation of the actuator 14 can be suppressed.

Note that the rotation device 10 according to the present invention is not limited to the form described above, and various modified embodiments can be considered. For example, for the actuator 14 used in the rotation device 10, it is possible to use components configured of various materials other than those types that are shown in FIGS. 3(a) and 3(b) and FIGS. 4(a) and 4(b). For example, an elastic material of rubber (a synthetic rubber, etc.) can be used for the bag body 26, and a material of vinyl chloride can also be used for the bag body 26. Further, if the rotary member 13 is desired to be positively made into the horizontal state when the fluid is not supplied, it can be considered that a biasing member for biasing the rotary member 13 in a direction opposite from the rotation direction of the rotary member 13 by the actuator 14 is attached to a surface opposite from the surface on which the actuator 14 is arranged so that the rotary member 13 and the placement member 12 are coupled. To such a biasing member, a belt-like rubber member (refer to FIG. 7(b) of Patent document 3, etc.) or a helical extension spring or the like can be applied.

Figure 6:
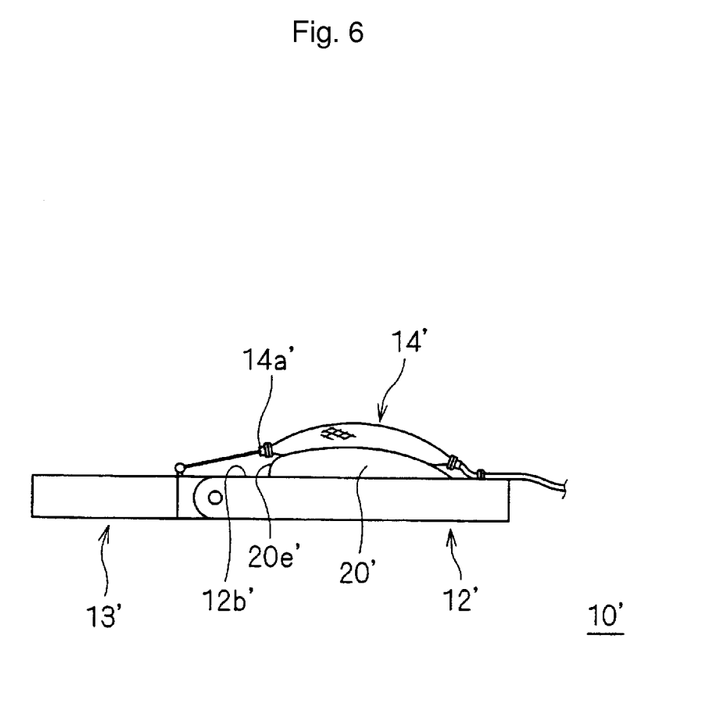
FIG. 6 is a side view showing a rotation device of a modified embodiment.

FIG. 6 shows a rotation device 10' of a modified embodiment. This modified embodiment is characterized in that the first slope face is not provided to a projecting part 20' which is to be provided in the upper face 12b' of a placement member 12'. For this reason, a tip 14a' of an actuator 14' placed on the projecting part 20' is located at the projection height of the projecting part 20' even if the fluid is not supplied. Therefore, a rotary member 13' in the horizontal state can be pulled from further above and, thus, a rotation of the rotary member 13' can be started even more smoothly.

Figure 7:
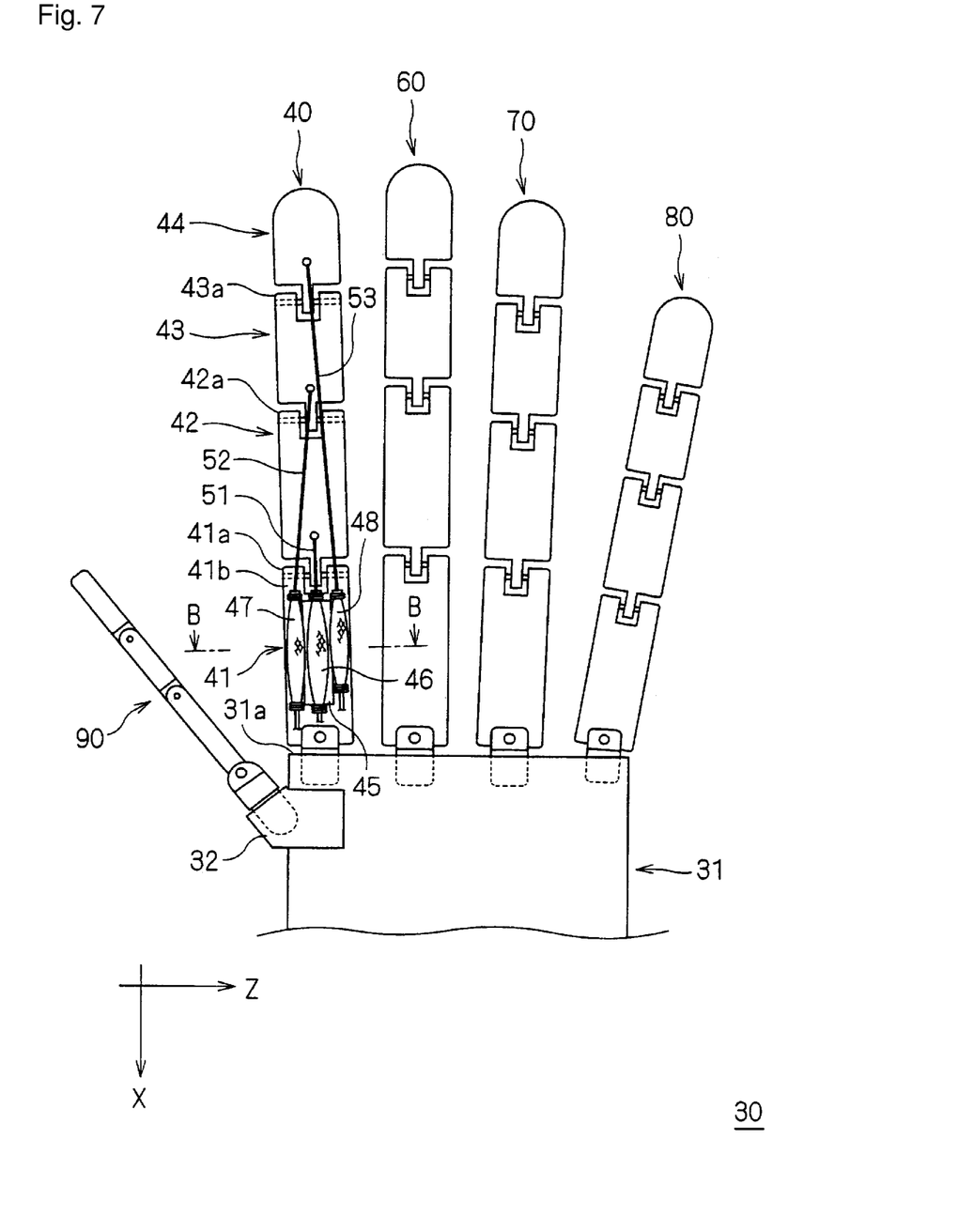
FIG. 7 is a plan view showing a hand device using a rotation device of another modified embodiment.

FIG. 7 shows a hand device 30 using rotation devices 40, 60, 70, 80, and 90 according to a modified embodiment of the present invention. The hand device 30 is just configured such that first to fourth rotation devices 40-80 are arranged at positions corresponding to parts from an index finger to a pinky finger of a human hand, and a fifth rotation device 90 is arranged at a position of a thumb. The first to fourth rotation device 40-80 are just attached to an end face 31a of a base member 31 located near the human's wrist, while the fifth rotation device 90 is attached to a supporting portion 32 fixed to the base member 31. Because each of the rotation devices 40-90 fundamentally has a configuration equivalent to each other, a configuration of the modified embodiment is described, represented by the first rotation device 40 which corresponds to the index finger. In FIG. 7, in order to avoid that the figure becomes complicated, illustrations of the actuators, the wire materials and the like are omitted in the rotation devices 60-90 other than the first rotation device 40.

In the first rotation device 40, a first rotary member 42 is rotatably coupled to one end part 41a side of a placement member 41 on which a first actuator 46, a second actuator 47, and a third actuator 48 are arranged in parallel to each other. In the first rotation device 40, a second rotary member 43 is rotatably coupled to an end part 42a of the first rotary member 42, and the third rotary member 44 is rotatably coupled to an end part 43a of the second rotary member 43. In addition, in the first rotation device 40, a projecting part 45 is provided in a central part of the placement member 41 in a width direction (the Z-direction in FIG. 7), the first actuator 46 is placed on the projecting part 45, and the second actuator 47 and the third actuator 48 are arranged on an upper face 41b of the placement member 41, at both sides of the first actuator 46, respectively.

The first actuator 46 is for a rotation of the first rotary member 42, and is coupled to the first rotary member 42 by a first wire material 51. Further, the second actuator 47 (corresponding to another actuator) is for a rotation of the second rotary member 43, and is coupled to the second rotary member 43 by a second wire material 52. Further, the third actuator 48 (corresponding to another actuator) is for a rotation of the third rotary member 44, and is coupled to the third rotary member 44 by a third wire material 53.

Figure 8:
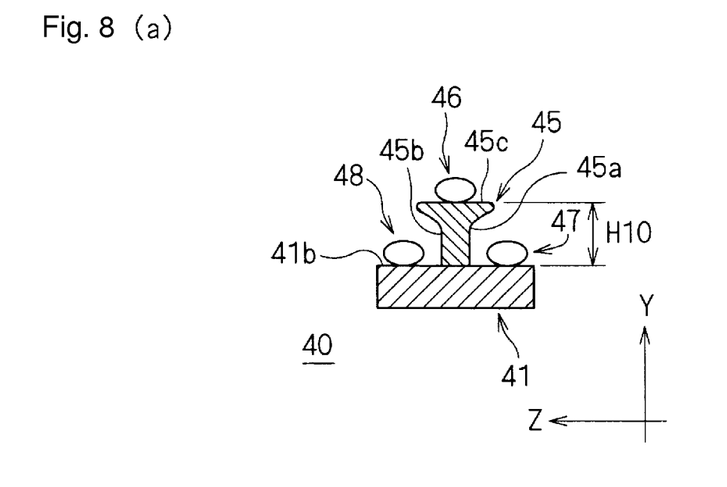
FIG. 8(a) is a cross-sectional view in a state where the fluid is not supplied to each actuator.
FIG. 8(b) is a cross-sectional view in a state where the fluid is supplied to each actuator.

The projecting part 45 on which the first actuator 46 is placed is equivalent to the projecting part 20 shown in FIGS. 2(a) and 2(b), and the like described above, regarding a projecting face 45c (refer to FIGS. 8(a) and 8(b)). However, shapes of side faces of the projecting part 45, to which the second actuator 47 and the third actuator 48 oppose, are different from the projecting part 20 described above.

FIGS. 8(a) and 8(b) are cross-sectional views taken along a line B-B in FIG. 7, where the projecting part 45 is made in a shape such that one side face 45a and the other side face 45b to which the second actuator 47 and the third actuator 48 oppose, respectively, are hollowed in concave shapes. As shown in FIG. 8(b), each of these side faces 45a and 45b is made in a circular curved concave face so that, when the second actuator 47 and the third actuator 48 are inflated to the maximum extent, the respective side faces 45a and 45b conform to the circular shapes of the respective actuators 47 and 48, respectively. The projecting face 45c of the projecting part 45 has a dimension of a height H10 from the upper face 41b of the placement member 41, and this height H10 is set greater than an outer diameter of each of the actuators 47 and 48 when the actuator is inflated to the maximum extent. Here, in order to increase a space efficiency for arranging each of the actuators 47 and 48, each of the actuators 47 and 48 are arranged so that a curvature of the concave face of each of the side faces 45a and 45b curved in the circular arc shape in the projecting part 45 is in agreement with a curvature corresponding to an outer diameter of each of the actuators 47 and 48 when the actuator is inflated to the maximum extent, respectively, and the center of the circular arc formed by the concave face of each of the side faces 45a and 45b is in agreement with the center of each of the actuators 47 and 48 when the actuator is inflated to the maximum extent, respectively. Thus, the height of the placement member 41 from the upper face 41b can be further reduced, thereby contributing to a reduction in the device structure.

In such a modified embodiment, as shown in FIG. 8(b), even if the fluid is supplied to each of the actuators 46-48 simultaneously, each of the actuators 46-48 can be prevented from being inflated while interfering with each other. Therefore, each of the actuators 46-48 can be arranged so as to be packed in the Z-direction, thereby this arrangement will be suitable when two or more actuators are arranged so as to be packed parallely in intervals. In the meantime, two actuators 47 and 48 are arranged on both sides of the projecting part 45 in FIG. 7, and FIGS. 8(a) and 8(b). However, such a configuration having the hollowed side faces can be applied also to a case in which an actuator is arranged only to either one of the sides.

Figure 9:
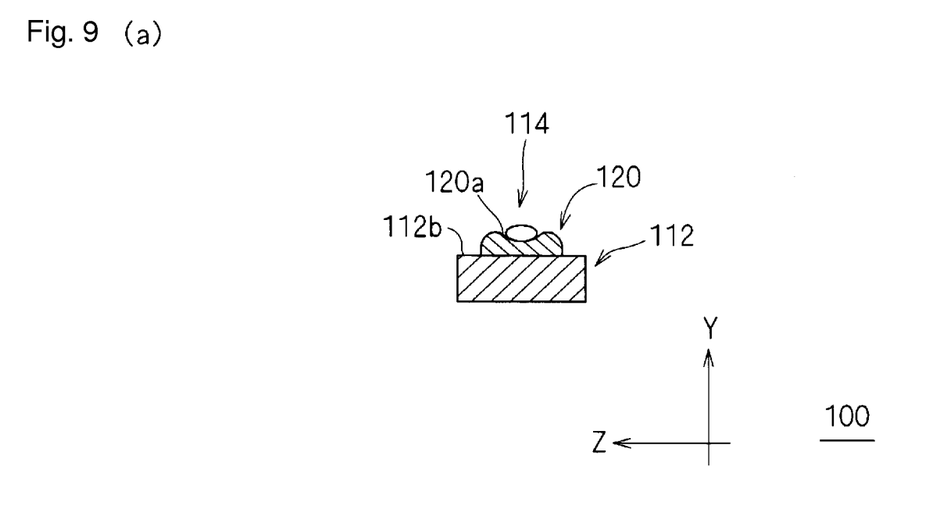
FIG. 9(a) is a cross-sectional view in a state where fluid is not supplied to each actuator.
FIG. 9(b) is a cross-sectional view in a state where the fluid is supplied to each actuator.

FIGS. 9(a) and 9(b) show a rotation device 100 of another modified embodiment. FIGS. 9(a) and 9(b) are cross-sectional views of the same part as FIG. 1(c), and it is characterized in that a projecting face 120a of a projecting part 120 provided in an upper face 112b of a placement member 112 is hollowed so as to be curved in a concave shape. A curvature of the curve of the projecting face 120a is in agreement with a curvature corresponding to an outer diameter of an actuator 114 arranged on the projecting face 120a when the actuator is inflated to the maximum extent. Thereby, as shown in FIG. 9(a), in the state in which the fluid is not supplied to the actuator 114, the actuator 114 can be inflated smoothly without being influenced by the curved projecting face 120a. Further, when the actuator is inflated to the maximum extent, the actuator 114 will be in a state in which it just fits the projecting face 120a, and, therefore, even when the actuator 114 is inflated, a stable placing state of the actuator 114 can be secured. Such a projecting face 120a hollowed in the concave shape can be applied to both the first slope face 20b and the second slope face 20c shown in FIGS. 2(a) and 2(b). However, as especially shown in FIG. 9(b), in order to stabilize the actuator 114 in the inflated state, it will be suitable to hollow the second slope face 20c so as to be curved in a concave shape. Of course, such a projecting face of this modified embodiment (the projecting surface hollowed so as to be curved in the concave shape) is applicable also to the projecting parts 20', 40 and the like of the modified embodiments shown in FIG. 6, and FIGS. 8(a) and 8(b).

INDUSTRIAL APPLICABILITY

The rotation device of the present invention rotates the rotary member coupled to the placement member on which the hydraulic actuator is arranged, by an operation of the actuator, and is increased with the rotation angle range of the rotary member compared with the conventional rotation device. The rotation device of the present invention is applicable to various manufacturing equipments in factories (especially, handling devices) or the like, as well as applicable to a hand part of various robots for industrial use, welfare use or the like, and an artificial arm or the like.

What is claimed is:

1. A rotation device comprising:
a tubular actuator that inflates in a diameter direction so that a full length is shortened by being supplied with fluid;
a placement member on which the actuator is arranged and to which one end part side of the actuator is fixed;
a rotary member rotatably coupled to the placement member at an other end part side of the actuator; and
a wire material for connecting the other end part of the actuator with the rotary member;
wherein the placement member is provided with a projecting part on a surface thereof;
wherein a projecting face of the projecting part has a first slope face where a projecting dimension thereof is higher from a connecting side of the rotary member to an intermediate portion of the projecting part, and a second slope face where a projecting dimension thereof is lower from the intermediate portion to the fixed side of the actuator, in a direction corresponding to the full length direction of the actuator,
wherein the actuator is arranged on the projecting face of the projecting part; and
wherein the second slope face is less slippery compared with the first slope face.

2. The rotation device of claim 1, wherein the projecting face of the projecting part is hollowed so as to be curved in a concave shape.

3. The rotation device of claim 2, wherein a curvature of the projecting face is in agreement with a curvature corresponding to an outer diameter of the actuator when the actuator is inflated to a maximum extent.

4. The rotation device of claim 2, wherein another actuator is arranged, on the placement member, in parallel with the actuator; and
wherein a side face of the projecting part to which the other actuator opposes is hollowed in the concave shape.

5. The rotation device of claim 1, wherein the second slope face of the projecting part is hollowed so as to be curved in a concave shape.

6. The rotation device of claim 5, wherein another actuator is arranged, on the placement member, in parallel with the actuator; and
wherein a side face of the projecting part to which the other actuator opposes is hollowed in the concave shape.

7. The rotation device of claim 1, wherein another actuator is arranged, on the placement member, in parallel with the actuator; and
wherein a side face of the projecting part to which the other actuator opposes is hollowed in a concave shape.

8. The rotation device of claim 1, wherein a surface roughness of the second slope face is larger than a surface roughness of the first slope face.

9. The rotation device of claim 8, wherein the projecting face of the projecting part is hollowed so as to be curved in a concave shape.

10. The rotation device of claim 9, wherein a curvature of the projecting face is in agreement with a curvature corresponding to an outer diameter of the actuator when the actuator is inflated to a maximum extent.

11. The rotation device of claim 9, wherein another actuator is arranged, on the placement member, in parallel with the actuator; and
wherein a side face of the projecting part to which the other actuator opposes is hollowed in the concave shape.

12. The rotation device of claim 8, wherein the second slope face of the projecting part is hollowed so as to be curved in a concave shape.

13. The rotation device of claim 8, wherein another actuator is arranged, on the placement member, in parallel with the actuator; and
wherein a side face of the projecting part to which the other actuator opposes is hollowed in a concave shape.

14. The rotation device of claim 1, wherein a friction sheet is applied to the second slope face.

15. The rotation device of claim 14, wherein the friction sheet is a rubber sheet.

16. The rotation device of claim 14, wherein the projecting face of the projecting part is hollowed so as to be curved in a concave shape.

17. The rotation device of claim 16, wherein a curvature of the projecting face is in agreement with a curvature corresponding to an outer diameter of the actuator when the actuator is inflated to a maximum extent.

18. The rotation device of claim 14, wherein the second slope face of the projecting part is hollowed so as to be curved in a concave shape.

19. The rotation device of claim 18, wherein another actuator is arranged, on the placement member, in parallel with the actuator; and
wherein a side face of the projecting part to which the other actuator opposes is hollowed in the concave shape.

20. The rotation device of claim 14, wherein another actuator is arranged, on the placement member, in parallel with the actuator; and wherein a side face of the projecting part to which the other actuator opposes is hollowed in a concave shape.

* * * * *